(12) United States Patent
Lorenzon

(10) Patent No.: US 8,603,538 B2
(45) Date of Patent: Dec. 10, 2013

(54) PROCESS FOR THE PRODUCTION OF AN N-BUTYRIC ACID COMPOUND IN MICRO ENCAPSULATED FORM, FOR ANIMAL OR HUMAN CONSUMPTION

(75) Inventor: Maurizio Lorenzon, Noale (IT)

(73) Assignee: Sila S.r.l., Noale (VE) (IT)

( * ) Notice: Subject to any disclaimer, the term of this patent is extended or adjusted under 35 U.S.C. 154(b) by 155 days.

(21) Appl. No.: 13/131,263

(22) PCT Filed: Nov. 25, 2009

(86) PCT No.: PCT/EP2009/065794
§ 371 (c)(1),
(2), (4) Date: Aug. 8, 2011

(87) PCT Pub. No.: WO2010/060914
PCT Pub. Date: Jun. 3, 2010

(65) Prior Publication Data
US 2011/0287104 A1    Nov. 24, 2011

(30) Foreign Application Priority Data
Nov. 28, 2008 (IT) .............................. PD2008A0352

(51) Int. Cl.
*A61K 9/50* (2006.01)
*A61K 31/19* (2006.01)
*B05D 7/00* (2006.01)

(52) U.S. Cl.
USPC .............................. 424/498; 514/557; 427/212

(58) Field of Classification Search
USPC .............................. 424/498; 514/557; 427/212
See application file for complete search history.

(56) References Cited

U.S. PATENT DOCUMENTS

| 5,008,118 | A * | 4/1991 | Iwanami et al. | 424/498 |
| 6,569,463 | B2 * | 5/2003 | Patel et al. | 424/497 |
| 2004/0009206 | A1 * | 1/2004 | Piva et al. | 424/438 |
| 2007/0128266 | A1 * | 6/2007 | Ajani et al. | 424/451 |

FOREIGN PATENT DOCUMENTS

| EP | 1354520 A | 10/2003 |
| EP | 1358805 A | 11/2003 |
| EP | 1439160 A | 7/2004 |
| WO | 2006085346 A | 8/2006 |
| WO | 2008098807 A | 8/2008 |

OTHER PUBLICATIONS

Ash et al.: Hand Book of Fillers, Extenders and Diluents, Synapse Information Resources, Inc., 2007.*
Soybean Oil: retrieved from internet: http://en.wikipedia.org/wiki/Soybean_oil. Retrieved on Feb. 26, 2013.*
MSDS of Hydrogenated Soybean oil: retrieved from internet: www.chemicalassociates.com/CA0175.pdf. Retrieved on Feb. 26, 2013.*
Palm Butter: retrieved from internet: http://encyclopedia2.thefreedictionary.com/palm+butter.Retrieved on Feb. 26, 2013.*
Surfactant: retrieved from internet:http://en.wikipedia.org/wiki/Surfactant. Retrieved on Feb. 26, 2013.*
IPRP dated Feb. 21, 2011 in PCT parent application PCT/EP2009/065794.
ISR and Written Opinion dated Apr. 29, 2010 in parent application PCT/EP2009/065794.
L. Spina et al., "Butyric acid: pharmacological aspects and routes of administration", Digestive and Liver Disease, 2007, pp. 7-11.

* cited by examiner

*Primary Examiner* — Ernst Arnold
*Assistant Examiner* — Hong Yu
(74) *Attorney, Agent, or Firm* — Kristina Castellano; Castellano PLLC

(57) ABSTRACT

A process for the production of an n-butyric acid compound in microencapsulated form comprises the stages of:—providing a granular material based on the n-butyric acid compound, —mixing the granular material with a matrix having a content of long-chain C14-C22 saturated fatty acids of from 40% to 95%, and an amount of between 1% and 20% of a mineral agent in which an effective amount of calcium sulphate dihydrate is present, heating the mixture to a temperature higher than the melting temperature of the lipid component of the matrix, —spraying the mixture into a cooling chamber having a temperature lower than the melting temperature of the lipid component of the matrix, so that the latter solidifies around the granular material, forming a covering thereof.

11 Claims, No Drawings

PROCESS FOR THE PRODUCTION OF AN N-BUTYRIC ACID COMPOUND IN MICRO ENCAPSULATED FORM, FOR ANIMAL OR HUMAN CONSUMPTION

CLAIM FOR PRIORITY

This application is a U.S. National Stage Application of PCT/EP2009/065794 filed on Nov. 25, 2009, claiming priority to Italian Application No. PD2008A000352 filed Nov. 28, 2008, the contents of both of which are incorporated herein by reference.

TECHNICAL FIELD

The present invention refers to a process for the production of an n-butyric acid compound in microencapsulated form for animal or human consumption, having the characteristics set out in the preamble to the main claim.

BACKGROUND ART

It is known that some n-butyric acid compounds have advantageous biological effects on the digestive system, stimulating the growth of the intestinal villi and modifying the development of gastro-enteric micro-organisms.

Butyric acid is a short-chain, monocarboxylic fatty acid (4 carbon-atom chain) which is also classified amongst the volatile fatty acids (VFAs) together with acetic acid (2 carbon-atom chain) and propionic acid (3 carbon-atom chain). Butyric acid has 2 isomers, n-butyric acid and isobutyric acid. At ambient temperature, n-butyric acid is in liquid form and also has a characteristic rancid butter odour which is noticed by humans and by many animal species even in very low concentrations.

Amongst the n-butyric acid compounds which are of greatest interest are its salts and its esters, which are generally referred to as "butyrates", and in particular, its sodium salt.

N-butyric acid ester is commercially available in liquid form whereas the n-butyric acid sodium salt is commercially available both in liquid form (in 50% aqueous solution—as a direct product of the reaction for the synthesis of the sodium salt from n-butyric acid) and in solid granular form (as a white powder which is stable up to 250° C.).

Depending on the surrounding environment, n-butyric acid compounds may be in dissociated form or in non-dissociated form; the latter is of particular importance at the biological level since it can be absorbed by the intestinal walls and by the cell membranes of micro-organisms and can have a more marked effect than the dissociated form.

Butyrates are produced mainly from hydrocarbons (cellulose and starch) by fermentation in anaerobic conditions by various micro-organisms and this process also takes place in the large intestine. After its formation, the butyrate is partially metabolized and the non-metabolized fraction of the non-dissociated butyrate is absorbed in the large intestine and enters the circulation.

It can be seen from data reported in the literature that volatile fatty-acid salts can inhibit the growth of haemolytic *Escherichia coli* strains by up to 50% (Galfi P., Neogrady S., 1992).

Amongst these salts, n-butyric acid salts have the greatest inhibiting power and this increases with reduction in pH, which favours the presence of its non-dissociated form. It has come to light from studies on the effects of an n-butyric acid salt on various strains of micro-organisms of the digestive system (Galfi P., Neogrady S., 1991) that the reduction in the development of *E. coli* is due to a direct effect of the butyrate and to an increase in the development of *Lactobacilli*. The antimicrobial effect of this salt is therefore selective. Other micro-organisms that are sensitive to n-butyric acid salts and to pH are: *Clostridium acetobutylicum, Escherichia coli, Streptococcus cremoris, Lactococcus lactis* and *cremoris*, and *Salmonella* species, whereas *Lactobacillus* species and *Streptococcus bovis* are less sensitive.

Butyrate has a further biological effect, more precisely, a stimulating effect on the growth of the wall of the digestive system (Galfi P., Neogrady S., 1991).

These studies are supported by the results obtained from animal feed tests which show a greater daily increase in weight, an improved utilization of feeds, and reduced mortality.

Alongside their considerable capacities, however, n-butyric acid compounds have a considerable disadvantage due to the decidedly unpleasant rancid butter odour which characterizes the starting n-butyric acid and which complicates the production and storage processes.

In fact, these compounds do not have unpleasant odours per se but they are particularly sensitive to acid environments in which they can easily hydrolyze and reform the original n-butyric acid, with the above-mentioned disadvantages.

For this reason, if butyrate were administered as such to an animal or to a human being, n-butyric acid would immediately form at gastric level, rendering the butyrate no longer available for absorption at intestinal level.

To limit this problem, it is known to microencapsulate the butyrate by coating it with a lipid matrix.

EP1354520, in the name of the Applicant, discloses a granulated product having a core of butyrate microencapsulated in a lipid structure with buffer compounds such as carbonates and bicarbonates.

It is thus sought to protect the butyrate from any acid compounds present in the feed and, in particular, from the strongly acid environment that is present at gastric level, but to allow it to be released at intestinal level, by virtue of the degradative action of specific enzymes on the lipid matrix.

In spite of the excellence of the principle underlying this measure, the problem can be considered only partially solved, however, since a considerable fraction of the microencapsulated product is found to be degraded at gastric level. Moreover, the Applicant has also found that, particularly in the case of pig feed, some of the butyrate is also hydrolyzed during storage because of the presence of acid compounds in the feed.

WO 2008/098807, in the name of the Applicant, discloses a granulated product having a core of conjugated linoleic acid microencapsulated in a lipid matrix having a mineral agent structure comprising silica and optionally calcium carbonate or calcium sulphate dihydrate.

There is therefore still a need, in the technical field in question, to improve the process for the production of an n-butyric acid compound in microencapsulated form in order to improve the final characteristics of the product, in particular its resistance to acid environments.

SUMMARY OF THE INVENTION

The problem underlying the present invention is that of providing a process for the production of an n-butyric acid compound in microencapsulated form for animal or human consumption which is designed functionally to overcome the limitations discussed above with reference to the prior art mentioned.

Within the scope of this problem, an objective of the invention is to provide a product which is based on an n-butyric acid compound and which permits a slow and controlled release of the active ingredient in the intestine.

A further objective of the invention is to provide a process which does not increase the production costs of the product.

DESCRIPTION OF THE INVENTION

This problem is solved and these objectives are achieved by the present invention by means of a process for the production of an n-butyric acid compound in microencapsulated form according to the appended claims.

In general, the process according to the invention follows the process of microencapsulation by a spray cooling technique, providing for the stages of:
  providing a granular material based on an n-butyric acid compound,
  mixing the granular material with a lipid-based matrix, heating the mixture to a temperature higher than the melting temperature of the matrix,
  spraying the mixture thus obtained into a cooling chamber having a temperature lower than the melting temperature of the matrix, so that the latter solidifies around the granular material, covering it.

A granular product of suitable size, formed by an inner core which is based on an n-butyric acid compound and is surrounded and protected by a lipid-based covering, in other words which is microencapsulated, is thus obtained.

Preferably, the compound is a salt or an ester of n-butyric acid and, more preferably, it is the sodium salt of n-butyric acid.

In a first embodiment, the granular material is based on sodium butyrate in powder form with a degree of purity greater than 90-95%, having suitable particle dimensions, for example, of between 10 and 200 microns.

In a second preferred embodiment, the granular material is composed of a solid support in powder form on which an aqueous solution of sodium butyrate is adsorbed.

This adsorption stage takes place by mixing of the aqueous solution, typically with a 50% sodium butyrate content, with the solid support in a mixer which is subjected to stirring at high speed and kept at a temperature of about 60-70° C.

The solid support is preferably inorganic so as to resist degradative phenomena for a longer period of time and, more preferably, is based on silica, with average dimensions of between 10 and 80 microns, preferably between 15 and 20 microns.

The silica used is preferably of synthetic derivation, substantially free of metals, and with a neutral pH so as to avoid dissociation of the sodium butyrate.

The amount of silica used will be sufficient to achieve complete adsorption of the sodium butyrate, generally between 33% and 55% relative to the liquid sodium butyrate.

Upon completion of this first process stage, a smooth-running, powdery material is obtained which will constitute the inner core of the finished product.

It is important to stress that, as well as adsorbing the liquid sodium butyrate, the silica confers a suitable consistency on the mixture obtained in a subsequent process stage for admission to the spray cooling chamber, so as to promote correct formation of the finished granular product.

The granular material obtained in one of the two processes described above is then mixed with a lipid-based matrix having a content of between 40% and 95% of saturated fatty acids with 14, 16, 18, 20 and 22 carbon atoms (briefly C14, C16, C18, C20 and C22), in which an amount of between 1% and 20% by weight, relative to the matrix, of a mineral agent is also present.

When the granular material is formed by sodium butyrate in powder form, the mineral agent is added to the mixture of lipid matrix and sodium butyrate whereas, if the granular material is formed by an aqueous solution of sodium butyrate adsorbed on silica, the mineral agent is preferably added to the aqueous solution during the adsorption stage, together with the silica.

According to a first aspect of the invention, the mineral agent comprises an effective amount of calcium sulphate dihydrate, $CaSO_4 2(H_2O)$.

The fraction of calcium sulphate dihydrate in the mineral agent is preferably higher than 50%; more preferably, it is higher than 95%.

The use of calcium sulphate dihydrate has been found essential to obtain a finished product having optimal characteristics of resistance to acid environments. In particular, this compound has been found much more effective than other mineral agents commonly used in the field such as, for example, calcium carbonate. It will be noted, moreover, that this result is surprising, since calcium carbonate is a basic salt and hence theoretically more suitable for protecting the core of the microencapsulated product in acid environments.

According to a further aspect of the invention, at least 80% of the weight of the lipid component of the matrix consists of glycerides of C14-C22 saturated fatty acids.

The term "saturated" should not be understood in an absolute sense but is intended to indicate fatty acids having a saturation level of at least 99%. Moreover, it is particularly important that the fatty acids present in the matrix be present substantially in the form of glycerides and not of free acids. For this purpose, the percentage of free acids within the lipid component of the matrix should be less than 10% and preferably less than 1%.

The glycerides are preferably in the form of triglycerides.

The lipid component of the matrix according to the invention preferably also has a C18 saturated fatty acid content of between 20% and 50% and a C16 saturated fatty acid content of between 50% and 75%, relative to the total saturated fatty acids constituting the glycerides.

The lipid component of the matrix is preferably based on hydrogenated palm oil.

The composition of the lipid component of the matrix is such as to have a melting point of between 55° C. and 65° C.

The lipid component of the matrix is first of all heated to melting point and is then mixed with the granular material obtained by the adsorption of the liquid sodium butyrate on the silica, in which the mineral agent may already be present or, alternatively, with the granular material formed by the solid sodium butyrate and by the mineral agent.

The mixing preferably takes place in the presence of suitable emulsifying agents such as, for example, propylene glycol esters so as to promote a homogeneous dispersal of the silica powder or of the solid sodium butyrate in the lipid matrix.

Moreover, other polymer compounds based on cellulose and/or derivates thereof are also preferably added to the mixture as stabilizers, amongst other things.

Mixing is carried out for about 10-20 minutes to give a homogeneous mixture (although, more precisely, the system obtained can better be defined as a homogeneous suspension of a solid powder in a molten matrix).

According to a variant of the process of the invention, amounts variable between 0.1% and 5% of one or more essential oils are also added to the mixture as flavourings, antioxidants and antibacterial agents (thus strengthening the antibacterial activity of the butyrate itself).

Examples of essential oils advantageously usable as additives in the above-described mixture are oreganum oil (for its carvacrol and thymol content), orange oil (for its d-limonene content), clove oil or cinnamon oil (for their eugenol content), rosemary oil, garlic oil, or sage oil.

Once the desired homogeneity has been achieved, the mixture is immediately injected at high pressure and by means of nozzles of suitable shape, into a spray cooling chamber in which the temperature is kept between −2° C. and −12° C. so that, during the short time for which the particles of the mixture remain in the air, the lipid component of the matrix can advantageously solidify in accordance with procedures known per se (spray cooling technique).

A solid, granular product is thus obtained, comprising an inner core formed by the active ingredient which may be represented by a granule of sodium butyrate or by a granule of silica in which the aqueous solution thereof is adsorbed, and a covering and protecting coating of the inner core formed by the lipid component of the matrix, the mineral agent, and the emulsifying agent.

After spraying, the product is collected on conveyor belts and, when still inside the cooling chamber, is subjected to forced ventilation so as to emerge from the chamber at a temperature below the melting point and hence in the solid state.

To prevent agglomeration of the granular product, if 80% of its particles have a size below 500 microns, it is sprinkled with an anti-agglomeration agent constituted, for example, by silica and/or perlites and/or sepiolites with a particle size of between 75 and 80 microns.

The granule size depends on the supply pressure and the nozzle shape but, if necessary, the product may be subjected to screening to render it consistent with the desired dimensional specification.

By virtue of the specific production process and the matrix used, the covering obtained is arranged continuously and uniformly around the inner butyrate portion.

PREPARATION EXAMPLES

Example 1 (Solid Sodium Butyrate)

55 g of lipid matrix constituted by C14, C16, C18 saturated fatty acid triglycerides, to which 10 g of calcium sulphate dihydrate and 5 g of propylene glycol esters had been added, was introduced into a mixer with a jacket heated to a temperature of 70° C. The matrix was kept at a temperature of 70° C. and 30.6 g of solid sodium butyrate in powder form with a degree of purity of 98-99% was introduced into it. The mixture was stirred for about 15 minutes to give a homogeneous suspension.

The mixture thus obtained was then supplied to a cooling chamber which was kept at a temperature of about −10° C., into which the mixture was sprayed with the use of a suitable nozzle so as to obtain granules with an inner core based on sodium butyrate, covered by a mineral-lipid covering.

Example 2 (Liquid Sodium Butyrate—50% Solution)

30 g of a 50% aqueous solution of sodium butyrate, to which 12 g of silica and 7 g of calcium sulphate dihydrate had been added, was introduced into a mixer with a jacket heated to a temperature of 70° C. The mixture was stirred until the aqueous solution was completely adsorbed, that is, until a smooth-running powder was obtained. 51 g of C14, C16, C18 saturated fatty acid triglycerides and 1 g of propylene glycol esters were then added. The mixture was stirred at a temperature of 65° C. for about 15 minutes to give a homogeneous suspension.

The mixture thus obtained was then supplied to a cooling chamber which was kept at a temperature of about −10° C., into which the mixture was sprayed with the use of a suitable nozzle so as to obtain granules with an inner core formed by a silica granule in which the aqueous sodium butyrate solution was adsorbed, covered by a mineral-lipid covering.

Example 3 (Solid Sodium Butyrate—Comparative)

70 g of lipid matrix constituted by C14, C16, C18 saturated fatty acid triglycerides was introduced into a mixer with a jacket heated to a temperature of 70° C. The matrix was kept at a temperature of 70° C. and 30 g of solid sodium butyrate in powder form with a degree of purity of 98-99% was introduced into it. The mixture was stirred for about 15 minutes to give a homogeneous suspension. The mixture thus obtained was then supplied to a cooling chamber which was kept at a temperature of about −10° C., into which the mixture was sprayed with the use of a suitable nozzle so as to obtain granules with an inner core based on sodium butyrate covered by a lipid covering.

Analysis of the Products

The samples of Examples 1 and 3 were subjected to an in vitro digestion consisting of a series of tests which reproduce a three-stage chemical and enzymatic incubation, in accordance with the test protocol established by Boisen.

For each product to be analyzed, 3-5 g of the sample to be subjected to the digestion test were obtained and weighed, at least in triplicate and with an accuracy of ±0.1 mg, and were subjected to the three stages described below.

Each of the three stages tends to reproduce in vitro the various main stages of digestion inside the digestive tract (stomach, small intestine and large intestine) with investigation, in particular, of the activity of specific enzymes (lipase) for the digestion of the covering of the microcapsules.

Stage 1

The three samples of each microencapsulated product were weighed into 100 ml flasks. 25 ml of phosphate buffer (0.1 M pH 6.0) was added to each sample with gentle stirring with a magnetic stirrer. 10 ml of 0.2 M HCl was added to the mixture and the pH was brought to pH 2 with the use of 1 M HCl or NaOH solution. 1 ml of a freshly prepared solution containing 25 mg of pepsin (2000 FIP-U/g) was then added to the mixture. The flasks were closed with plastics stoppers and kept in a water-bath at 39° C. for 2 hours.

Stage 2

10 ml of phosphate buffer (0.2 M, pH 6.8) and 5 ml of a 0.6 M NaOH solution were added to the mixture. The pH was corrected to 6.8 with 1 M HCl or NaOH. The mixture was stirred gently with 1 ml of a freshly prepared solution containing 100 mg of pancreatin. After the flasks had been closed with plastics stoppers, the flasks were incubated for 4 hours in a water-bath kept thermostatically at 39° C.

Stage 3

The pH of the mixture from the preceding stage was adjusted to pH 7.0 with the use of a 1 M NaOH solution. 100 mg of lipase was then added and the mixture was stirred for 18 h at 39° C.

Upon completion of each of the above-described stages, a portion of the mixture was withdrawn and filtered, the residual microcapsules were washed with distilled water and then subjected to the preparation provided for by the specific analysis method in order to identify their sodium butyrate content.

The sodium butyrate content was then related to the initial content and reported in Table 1 below.

TABLE 1

| Samples | Stage 1 (residual % of sodium butyrate) | Stage 2 (residual % of sodium butyrate) | Stage 3 (residual % of sodium butyrate) |
|---|---|---|---|
| Example 1 | 61.17 | 26.68 | 19.73 |
| Example 3 | 54.85 | 37.10 | 11.55 |

The results given in Table 1 show that, by virtue of the process according to the invention, the product obtained is more resistant than the reference sample to the acid environment that is present at gastric level and, moreover, that the sodium butyrate content remains at relatively high levels, higher than the reference sample, favouring the slow release of the active ingredient and permitting its subsequent absorption even in the final, colon portion of the intestine.

The product obtained may be for either human or animal consumption.

The invention claimed is:

1. A process for the production of an n-butyric acid compound in microencapsulated form, comprising the stages of:
   providing a granular material based on the n-butyric acid compound,
   mixing the granular material with a matrix having a content of long-chain C14-C22 saturated fatty acids of from 40% to 95%, heating the mixture to a temperature higher than the melting temperature of the lipid component of the matrix, and
   spraying the mixture into a cooling chamber having a temperature lower than the melting temperature of the lipid component of the matrix, so that the latter solidifies around the granular material, forming a covering for the said granular material,
   wherein the matrix comprises a mineral agent in an amount of from 1% to 20% relative to the matrix, the mineral agent having a fraction of calcium sulphate dihydrate higher than 50%.

2. The process according to claim 1, wherein the fraction of the calcium sulphate dihydrate in the mineral agent is higher than 95%.

3. The process according to claim 1, wherein the long-chain C14-C22 saturated fatty acids are in the form of glycerides and represent at least 80% by weight of the matrix.

4. The process according to claim 3, wherein the saturated fatty acid glycerides are derived from hydrogenated palm oil.

5. The process according to claim 1, wherein an effective amount of propylene glycol distearate is provided as an emulsifying agent in the matrix.

6. The process according to claim 1, wherein the granular material is formed by adsorption of an aqueous solution of the n-butyric acid compound on a solid support.

7. The process according to claim 6, wherein the solid support is based on silica.

8. The process according to claim 6, wherein the mineral agent is added to the aqueous solution during the adsorption on the solid support.

9. The process according to claim 1, wherein one or more essential oils selected from the group consisting of origanum oil, orange oil, clove oil, cinnamon oil, rosemary oil, garlic oil, and sage oil, are further added to the matrix.

10. The process according to claim 1, wherein the compound is the sodium n-butyric acid salt.

11. A product in microencapsulated form, obtained by the process of claim 1, comprising a granular material based on n-butyric acid compound and a matrix having a content of C14-C22 saturated fatty acids of from 40% to 95%, wherein the matrix comprises a mineral agent in an amount of from 1% to 20% relative to the matrix, and the mineral agent has a fraction of calcium sulphate dihydrate higher than 50%.

* * * * *